(12) United States Patent
Wang et al.

(10) Patent No.: US 11,433,556 B2
(45) Date of Patent: Sep. 6, 2022

(54) GRIPPER WITH HIGH-PRECISION PINCHING FORCE SENSOR

(71) Applicant: Flexiv Ltd.

(72) Inventors: Shiquan Wang, Foster City, CA (US); Ran An, San Jose, CA (US)

(73) Assignee: FLEXIV LTD., Grand Cayman (KY)

( * ) Notice: Subject to any disclaimer, the term of this patent is extended or adjusted under 35 U.S.C. 154(b) by 471 days.

(21) Appl. No.: 16/547,116

(22) Filed: Aug. 21, 2019

(65) Prior Publication Data

US 2020/0238540 A1 Jul. 30, 2020

Related U.S. Application Data

(60) Provisional application No. 62/796,282, filed on Jan. 24, 2019.

(51) Int. Cl.
*B25J 15/08* (2006.01)
*B25J 13/08* (2006.01)

(52) U.S. Cl.
CPC ........... *B25J 15/086* (2013.01); *B25J 13/085* (2013.01)

(58) Field of Classification Search
CPC ...... B25J 15/086; B25J 13/085; B25J 13/082; B25J 15/0213; B25J 15/022
USPC .................................................. 700/245–264
See application file for complete search history.

(56) References Cited

U.S. PATENT DOCUMENTS

| 4,543,638 A | * | 9/1985 | Scarffe | B25J 9/10 700/83 |
| 4,600,357 A | * | 7/1986 | Coules | B25J 13/082 414/730 |
| 4,680,523 A | * | 7/1987 | Goumas | B25J 13/085 318/696 |
| 5,280,981 A | | 1/1994 | Schultz | |
| 5,855,583 A | * | 1/1999 | Wang | A61B 34/77 606/139 |
| 6,167,322 A | * | 12/2000 | Holbrooks | H01L 21/681 414/941 |
| 6,738,691 B1 | * | 5/2004 | Colgate | B25J 9/1689 318/632 |
| 7,160,172 B2 | * | 1/2007 | Frost | B24B 19/028 198/733 |

(Continued)

OTHER PUBLICATIONS

International Search Report and Written Opinion for App. No. PCT/US2020/014960 dated Apr. 6, 2020 (12 pages).

*Primary Examiner* — Jaime Figueroa
(74) *Attorney, Agent, or Firm* — K&L Gates LLP

(57) ABSTRACT

The present disclosure provides a gripper of a robot and a robot including the same. The gripper may include a case, a plurality of fingers rotatably connected to the case, and a plurality of connecting rods. A first end of each of the connecting rods may be connected to a respective one of the fingers. The gripper may also include a driving assembly connected to a second end of each of the connecting rods, and the driving assembly may be configured to drive the second end of each of the connecting rods to move along a moving direction so as to drive the plurality of finger to rotate. The gripper may further include a force detecting assembly connected to the case and the driving assembly, which may be configured to limit a position of the driving assembly along the moving direction and to detect a force from the driving assembly.

14 Claims, 4 Drawing Sheets

(56) References Cited

U.S. PATENT DOCUMENTS

| | | | |
|---|---|---|---|
| 8,191,947 B2* | 6/2012 | Jouan De Kervanoael | B25J 13/082 901/34 |
| 9,073,208 B2* | 7/2015 | Chung | B25J 9/1612 |
| 9,481,089 B2 | 11/2016 | Matsuzawa et al. | |
| 9,718,195 B1 | 8/2017 | Youmans | |
| 10,016,901 B2* | 7/2018 | Strauss | B25J 15/0213 |
| 10,022,874 B1* | 7/2018 | Xiong | B25J 15/0028 |
| 10,189,168 B2* | 1/2019 | Lessing | B25J 15/0023 |
| 10,377,045 B2* | 8/2019 | Xiong | B25J 15/103 |
| 2003/0083651 A1* | 5/2003 | Wang | A61B 34/75 901/14 |
| 2006/0135042 A1* | 6/2006 | Frost | B24B 19/028 451/41 |
| 2008/0058986 A1* | 3/2008 | Moldenhauer | B23H 11/00 700/245 |
| 2010/0156127 A1* | 6/2010 | De Kervanoael | B25J 15/0253 901/46 |
| 2012/0267055 A1* | 10/2012 | Rogalla | B25J 15/10 29/894.31 |
| 2013/0238129 A1* | 9/2013 | Rose | B25J 19/0029 700/258 |
| 2014/0180477 A1* | 6/2014 | Chung | B25J 15/0213 294/198 |
| 2015/0239126 A1* | 8/2015 | Matsuzawa | G01L 5/167 700/258 |
| 2015/0367509 A1* | 12/2015 | Georgeson | F41A 31/02 901/44 |

* cited by examiner

GRIPPER WITH HIGH-PRECISION PINCHING FORCE SENSOR

PRIORITY INFORMATION

The present application claims the benefit of priority under 35 U.S.C § 119(e) to U.S. Provisional Patent Application Ser. No. 62/796,282, entitled "GRIPPER WITH HIGH-PRECISIONAL PINCHING FORCE SENSOR" and filed on Jan. 24, 2019, the disclosure of which is herein incorporated by reference in its entirety.

TECHNICAL FIELD

The present disclosure generally relates to the robotics field, and in particular to a robot and a gripper of the robot.

BACKGROUND

A gripper is one important type of end effector of a robot. Grippers can be utilized to catch or release an external object. Typically, a driving component (e.g., an air cylinder) may be utilized to drive the gripper and to provide a constant force for holding the object during the movement of the robot. However, if the force of the gripper is too strong, the external object may be damaged. Thus, it is important to detect the force applied to the external object so as to adjust the driving component properly.

SUMMARY

The present disclosure provides a gripper of robot and a robot in order to detect the force applied on the object grasped by the gripper. In one embodiment, a gripper of a robot is provided comprising a case, a plurality of fingers rotatably connected to the case, and a plurality of connecting rods. A first end of each of the connecting rods may be connected to a respective one of the plurality of fingers. The gripper may further comprise a driving assembly connected to a second end of each of the connecting rods, and configured to drive the second end of each of the connecting rods to move along a moving direction so as to drive the plurality of fingers to rotate. The gripper may also include a force detecting assembly connected to the case and the driving assembly, and configured to limit a position of the driving assembly along the moving direction and to detect a force from the driving assembly.

In another embodiment, the driving assembly comprises a nut connected to the second end of each of the connecting rods, a lead screw penetrating through the nut and reciprocally coupled with the nut, and a driving component connected to the lead screw and configured to rotate the lead screw so as to move the nut and the second end of each of the connecting rods along the moving direction. The force detecting assembly may be connected to at least one of the lead screw and the driving component.

In yet another embodiment, the force detecting assembly comprises a connecting plate rotatably connected to the lead screw, wherein the connecting plate is fixed with the lead screw along the moving direction and a force sensor connected to the case and the connecting plate, and configured to detect an axial force applied to the connecting plate by the lead screw.

In a further embodiment, the connecting plate is connected to the lead screw through a rolling bearing capable of transmitting axial and radial forces.

In a still further embodiment, the force sensor includes one or more of a tension sensor, a pressure sensor, and a tension and pressure sensor.

In another embodiment, a first end of the lead screw is rotatably and slidably connected to the case to constitute a sliding pivot pair and a second end of the lead screw is slidably connected to a driven end of the driving component to constitute a sliding pair.

In a further embodiment, the force detecting assembly comprises a connecting plate on which the driving component is installed and a force sensor fixedly connected to the case and the connecting plate and configured to detect an axial force applied by the driving component on the connecting plate.

In yet another embodiment, the driving component is a motor.

In a still further embodiment, the driving assembly comprises a support connected to the second end of each of the connecting rods, a motor installed on the support, where a pinion is set on a driven end of the motor, and a gear rack assembly comprising a housing and a gear rack. The housing may be slidably connected to the case along the moving direction, the gear rack may extend along the moving direction and may engage with the pinion, and the force detecting assembly may abut against the housing to limit a position of the housing along the moving direction.

In another embodiment, a gripper for catching an object is provided comprising a case and a plurality of fingers rotatably connected to the case, where an end of each of the fingers extends outside the case for catching the object. The gripper may further include a plurality of connecting rods, where a first end of each of the connecting rods is fixedly connected to a respective one of the plurality of fingers, a driving assembly connected to a second end of each of the connecting rods and configured to drive the second end of each of the connecting rods to move in a first direction to clasp the fingers or in a second direction to unclasp the fingers, and a force detecting assembly connected to the case and the driving assembly, where the force detecting assembly is configured to limit a position of the driving assembly in the first direction or in the second direction, and to detect a feedback force from the driving assembly when the fingers are clasped and catch the object.

In a further embodiment, the driving assembly comprises a nut connected to the second end of each of the connecting rods, a lead screw penetrating through the nut and reciprocally coupled with the nut, and a motor connected to the lead screw and configured to rotate the lead screw so as to move the nut and the second end of each of the connecting rods in the first direction or in the second direction.

In yet another embodiment, the force detecting assembly comprises a connecting plate connected to the lead screw through a first ball bearing capable of transmitting axial and radial force and a force sensor connected to the case and the connecting plate, and configured to detect the feedback force applied on the connecting plate by the lead screw.

In a still further embodiment, a first end of the lead screw is connected to the case through a second ball bearing, wherein the second ball bearing provides radial support only and a second end of the lead screw is slidably connected to a driven end of the motor to constitute a sliding pair.

In another embodiment, a first end of the lead screw is connected to the connecting plate through the first ball bearing and a second end of the lead screw is slidably connected to a driven end of the motor to constitute a sliding pair.

In a further embodiment, a robot adapted to catch an object is provided comprising a case, a plurality of fingers rotatably connected to the case, and a plurality of connecting rods, where a first end of each of the connecting rods is fixedly connected to a respective one of the plurality of fingers. The robot may further include a driving assembly connected to a second end of each of the connecting rods and configured to drive the second end of each of the connecting rods to move along a moving direction so as to drive the plurality of fingers to rotate, and a force detecting assembly connected to the case and the driving assembly, and configured to limit a position of the driving assembly along the moving direction and to detect a force from the driving assembly.

In yet another embodiment, the driving assembly comprises a nut connected to the second end of each of the connecting rods, a lead screw penetrating through the nut and reciprocally coupled with the nut, and a driving component connected to the lead screw and configured to rotate the lead screw so as to move the nut and the second end of each of the connecting rods along the moving direction. The force detecting assembly may be connected to one selected from the group of the lead screw and the driving component.

In another embodiment, the force detecting assembly comprises a connecting plate rotatably connected to the lead screw, wherein the connecting plate is fixed with the lead screw along the moving direction and a force sensor connected to the case and the connecting plate, and configured to detect an axial force applied to the connecting plate by the lead screw.

In a further embodiment, the connecting plate is connected to the lead screw through a rolling bearing capable of transmitting axial and radial force.

In yet another embodiment, a first end of the lead screw is rotatably and slidably connected to the case to constitute a sliding pivot pair and a second end of the lead screw is slidably connected to a driven end of the driving component to constitute a sliding pair.

In a still further embodiment, the force sensor includes one or more of a tension sensor, a pressure sensor, and a tension and pressure sensor and the driving component is a motor.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE DRAWINGS

To more clearly explain the technical solutions in the embodiments of the present disclosure, the drawings used in the description of the embodiments will be briefly described below. The drawings in the following description are merely exemplary embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. The described embodiments are only a part of the embodiments of the present disclosure, not all of the embodiments. All other embodiments obtained by a person of ordinary skill in the art based on the embodiments of the present invention without creative efforts fall within the scope of the present invention.

Figure 1:
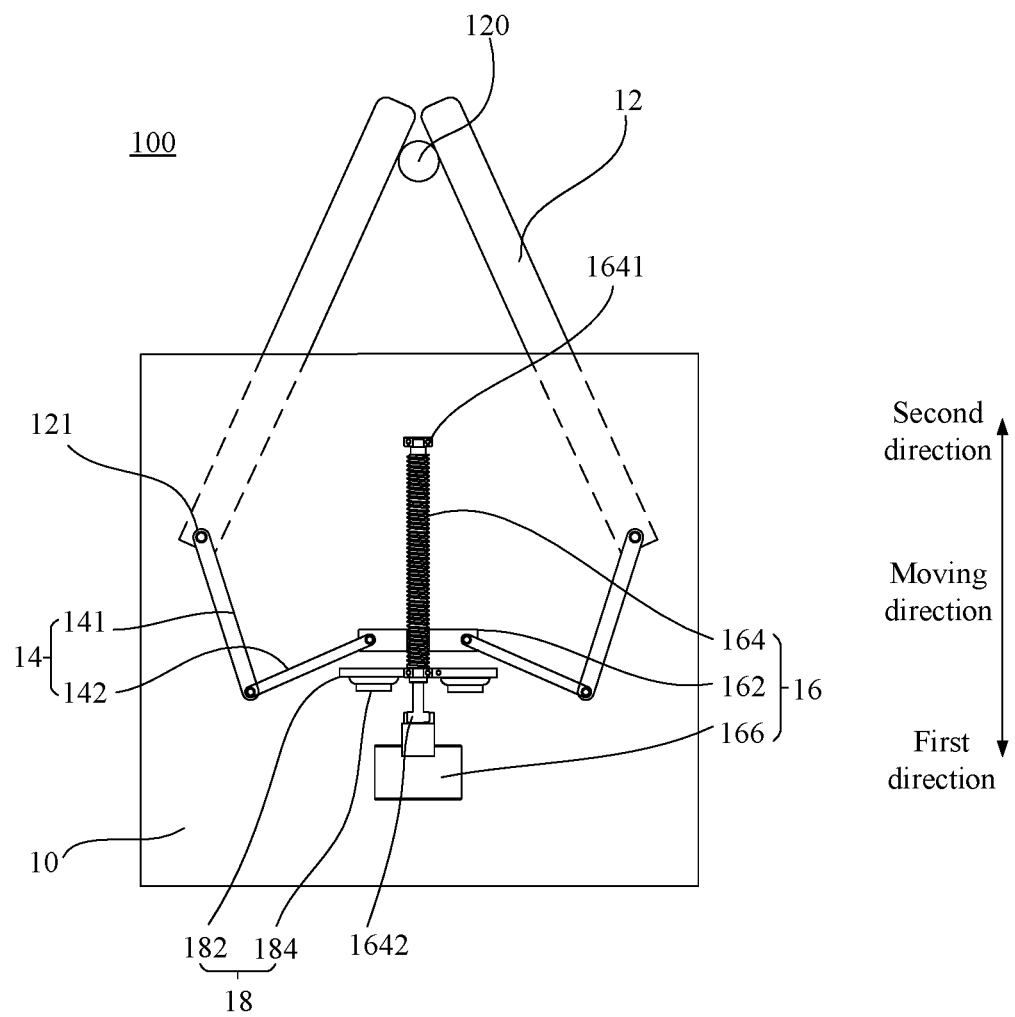
FIG. 1 is a structural diagram of a gripper of a robot according to an exemplary embodiment of the present disclosure.

FIG. 1 is a structural diagram of a gripper 100 of a robot according to an exemplary embodiment of the present disclosure. The gripper 100 may include a case 10, multiple fingers 12, multiple connected rods 14, a driving assembly 16, and a force detecting assembly 18. The gripper 100 may be utilized as an end effector of a robot, e.g., an articulated robot. The gripper 100 may be coupled with a plurality of robotic arms and may have multiple degrees of freedom for movement. The structure of the arms or other components of the robot may refer to related art and will not be discussed herein.

The case 10 of the gripper 100 may be made of metal material, non-metal material or composite material, such as aluminum, aluminum alloy, steel, carbon fiber reinforced composite and the like. The case 10 may define an accommodating space (not shown) for receiving other components. The case 10 may be a closed or sealed structure by sufficient means (e.g., rubber or similar seals) so as to protect the components disposed inside the case 10 from water and dust.

The fingers 12 may be made of the same or a different material as compared with the case 10, so long as the fingers 12 have enough structural strength for catching and holding an external object 120. Each finger 12 may be rotatably connected to the case 10. For example, one end of the finger 12 may connect to the case 10 through a pivot 121. Accordingly, the other portion of the finger 12 may rotate with respect to the case 10 about the pivot 121. In order to achieve the catching function, the number of the fingers 12 may be equal to or larger than two. In the example shown in FIG. 1, two fingers 12 are shown merely for illustrative purpose.

The connecting rods 14 are connected between the driving assembly 16 and the fingers 12. Specifically, a first end of each connecting rod 14 may be fixedly connected to a respective finger 12 such that the connecting rod 14 may rotate in accordance with the finger 12. A second end of the connecting rod 141 may be connected with the driving assembly 16, and the driving assembly 16 may be utilized to drive the second end of each connecting rod 14 to move along a moving direction (i.e., in the first direction or in the second direction opposite to the first direction, as shown in FIG. 1). Accordingly, the movement of the connecting rod 14 may lead to the movement of the finger 12. That is, the connecting rod 14 may convert the rotational motion of the finger 12 into linear motion of the driving assembly 16 along the determined moving direction. It should be understood that, for achieving this function, the connecting rod 14 may include several sub-rods. The number of the sub-rods of one connecting rod 14 may be two or more, which is not limited in the present disclosure (e.g., alternative implementations may include more than two sub-rods). For example, in the depicted embodiment, the connecting rod 14 may include a first sub-rod 141 and a second sub-rod 142. One end of the first sub-rod 141 is fixedly connected with the finger 12, while the other end of the first sub-rod 141 is rotatably connected with one end of the second sub-rod 142. Moreover, the other end of the second sub-rod 142 may be rotatably connected to the driving assembly 16. Thus, the linear motion of the portion of the driving assembly 16 may drive the second sub-rod 142 and the first sub-rod 141 to rotate and thereby cause the rotational motion of the finger 12. The driving assembly 16 may include any driving apparatus capable of providing linear driving force. For example, the driving assembly 16 may include a motor, a lead screw and a nut, or may include a motor, a gear rack and a pinion, or the driving assembly 16 may correspond to an air/liquid cylinder. The detailed structure of the driving assembly 16 will be discussed further below.

Figure 4:
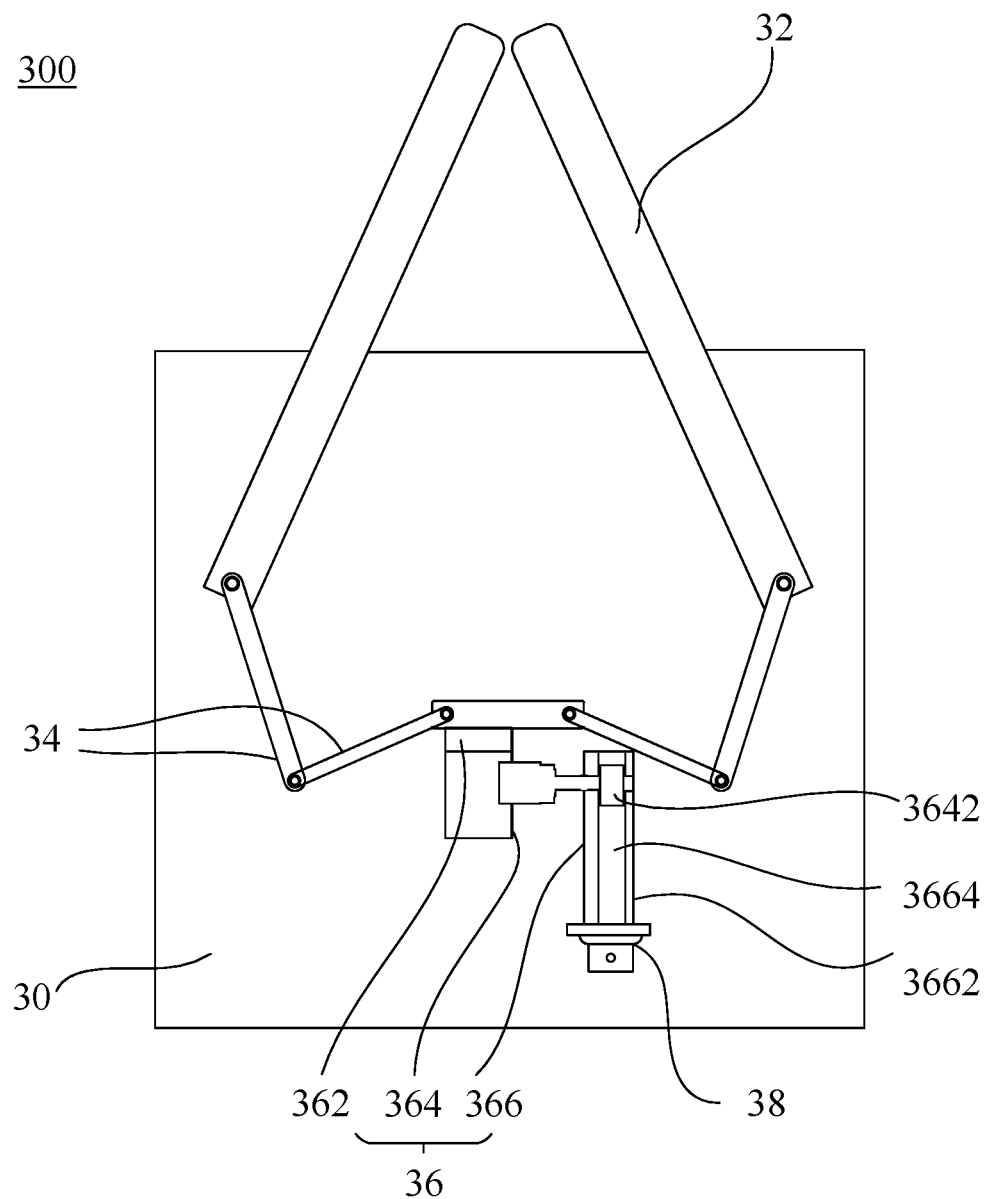
FIG. 4 is a structural diagram of a gripper of a robot according to an exemplary embodiment of the present disclosure.

In some embodiments, the finger 12 may be disposed on the outside of the case 10, while the connecting rod 14 may be disposed on the inside of the case 10, as shown in FIG. 1. Thus, the finger 12 may be utilized to catch the external object 120 outside the case 10, and the connecting rod 14 and the driving assembly 16 connected to the connecting rod 14 may be shielded inside the case. In such circumstances, the finger 12 and the connecting rod 14 may be connected through a shaft of the pivot 121 which extends through the case 10. The pivot 121 may be well sealed to prevent dust and water from entering. In other embodiments, as shown in FIG. 4, a portion of the finger 32 may also be disposed inside the case 30 together with the connecting rod 34. In such implementations, the end portion of the finger 32, located away from the connecting rod 34, may extend outside the case 30 through a slot (not shown) of the case 30 for catching an external object.

The force detecting assembly 18 may be connected to both the case 10 and the driving assembly 16. Although not shown in the figures, those of ordinary skill should understand that the force detecting assembly 18 may be installed on the inside of the case 10 by any suitable methods such as welding, clamping or screwing. The force detecting assembly 18 may be utilized to limit the position of the driving assembly 16 along the moving direction. Since the driving assembly 16 is free to move relative to the case 10 along the moving direction and the second end of the connecting rod 14 may move along the moving direction under the driving force provided by the driving assembly 16, any counter-acting force applied to the second end of the connecting rod 14 on the driving assembly 16 which lies in the moving direction is applied onto the force detecting assembly 18. Accordingly, by detecting this counter-acting force, the force detecting assembly 18 may also detect the driving force applied by the driving assembly 16 onto the second end of the connecting rod 14. Thus, the force applied by the fingers 12 onto the external object 120 may be calculated based on force and/or moment balance principle.

According to the present disclosure, as the driving assembly 16 is connected to the second end of each connecting rod 14 while the first end of each connecting rod 14 is fixedly connected to one finger 12 of the gripper 100, the rotation of the fingers 12 of the gripper 100 may be driven by the driving assembly 16. Moreover, since the driving assembly 16 is limited by the force detecting assembly 18 in the moving direction of the second end of each connecting rod 14, the force detecting assembly 18 may detect the force from the driving assembly 16. With this force, the grasping force of the gripper 10 may be calculated. Such implementations may be utilized to determine the force applied on the grasped object 120, thereby improving the control of the gripper 100 and the robot.

In some embodiments, the driving assembly 16 of the gripper 100 may include a nut 162, a lead screw 164, and a driving component 166. The nut 162 may be rotatably connected to the second end of each connecting rod 14. The lead screw 164 may penetrate through the nut 162 and reciprocally couple with the nut 162. That is, when the lead screw 164 rotates, the nut 162 moves in the moving direction, and vice versa. The driving component 166 may be connected to the lead screw 164 and may be configured to rotate the lead screw 164 such that the second end of each connecting rod 14 together with the nut 162 may be capable of movement along the moving direction. The driving component 166 may be any device capable of rotating the lead screw 164, for example, the driving component 166 may be a motor. In this embodiment, the force detecting assembly 18 may be connected to either the lead screw 164 or the driving component 166. Those of ordinary skill should understand that, in order to improve the stability of the gripper 100, when the lead screw 164 is connected to the force detecting assembly 18, the driving component 166 may be slidably connected to the case 10 to constitute a sliding pair along the moving direction, and vice versa.

Continuing to refer to FIG. 1, in some embodiments, the force detecting assembly 18 may include a connecting plate 182 and a force sensor 184. The connecting plate 182 may be rotatably connected to the lead screw 164 by means of, for example, a rolling bearing capable of transmitting both radial and axial forces. Thus, the counter-acting force applied by the nut 162 on the lead screw 164, i.e., the axial force on the lead screw 164, may be transmitted through the rolling bearing to the force sensor 184 and may be measured by the force sensor 184.

In this embodiment, the force sensor 184 may correspond to a tension sensor, a pressure sensor, or a tension and pressure sensor according to actual design requirements. For example, in the embodiment shown in FIG. 1, when the lead screw 164 drives the nut 162 to move in the first direction, the fingers 12 may be clasped and may catch the external object 120. In this situation, the force sensor 184 may be a pressure sensor disposed on the lower side (as shown in FIG. 1) of the connecting plate 182 to support the connecting plate 182 and to block the connecting plate 182 from continuing to move in the first direction. Alternatively, the force sensor 184 may be a tension sensor disposed on the upper side (not shown) of the connecting plate 182 to pull the connecting plate 182 and also to block the connect plate 182 from continuing to move in the first direction.

In some embodiments, a first end 1641 of the lead screw 164 (e.g., the upper end as shown in FIG. 1) may be rotatably and slidably connected to the case 10 to constitute a sliding pivot pair through, for example, a rolling bearing which is capable of transmitting radial force only. In this way, the case 10 or the rolling bearing 1641 may not limit the axial position of the lead screw 164 but may still fix the lead screw 164 at its radial position. It should be understood, in some embodiments, the connecting plate 182 may be connected to the first end 1641 of the lead screw 164 rather than being connected to a middle portion of the lead screw 164. In such implementations, the connecting plate 182 and the force sensor 184 may be configured to provide radial and axial support for the lead screw 164, and thus the rolling bearing which transmits only radial force may be omitted.

Figure 2:
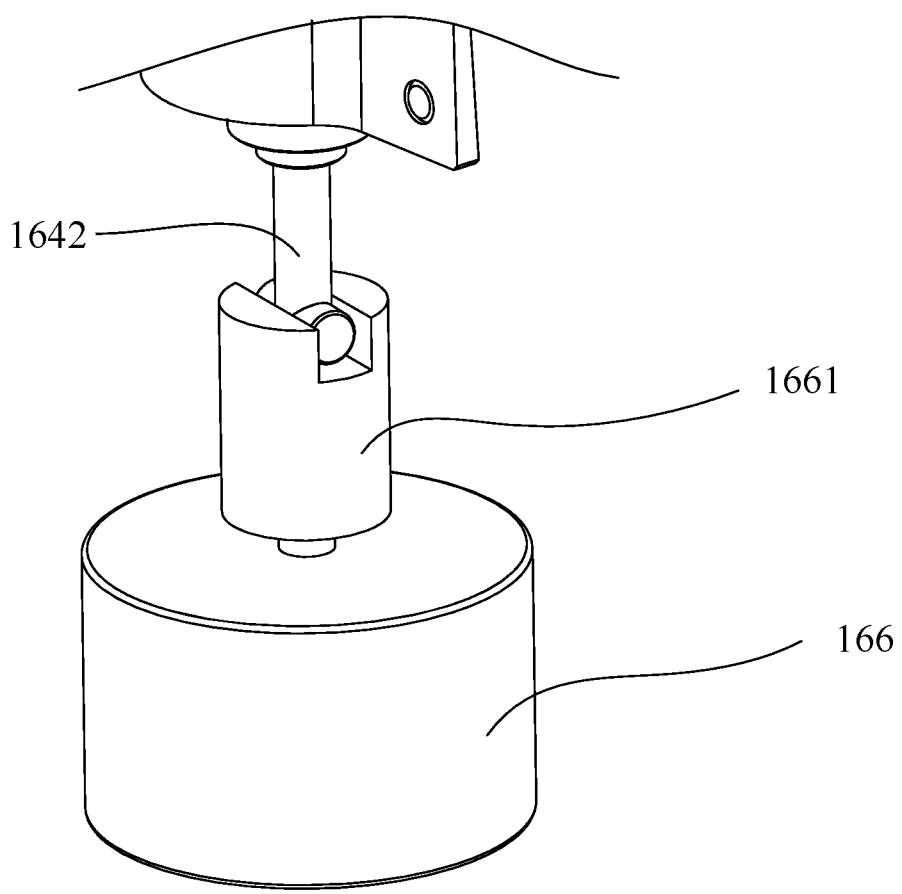
FIG. 2 shows a perspective view of part of a gripper of a robot according to an exemplary embodiment of the present disclosure.

In some embodiments, as shown in FIGS. 1 and 2, the second end 1642 of the lead screw 164 (e.g., the lower end as shown in FIG. 1) may be slidably connected to a driven end 1661 of the driving component 166 to constitute a sliding pair. Specifically, as shown in FIG. 2, the driven end 1661 of the driving component 166 may define a slot (not labeled) extending substantially perpendicular to the axial direction (i.e., the moving direction) of the lead screw 164. The second end 1642 of the lead screw 164 may include a limit block (not labeled) extending along the same direction as the slot. The limit block may be received in the slot and may move in the axial direction of the lead screw 164 in a certain range. However, the limit block may not be capable of rotating with respect to the driven end 1661. The driving component 166 and the limit block may thus drive the lead screw 164 to rotate without having to support the lead screw 164 along its moving direction.

Figure 3:
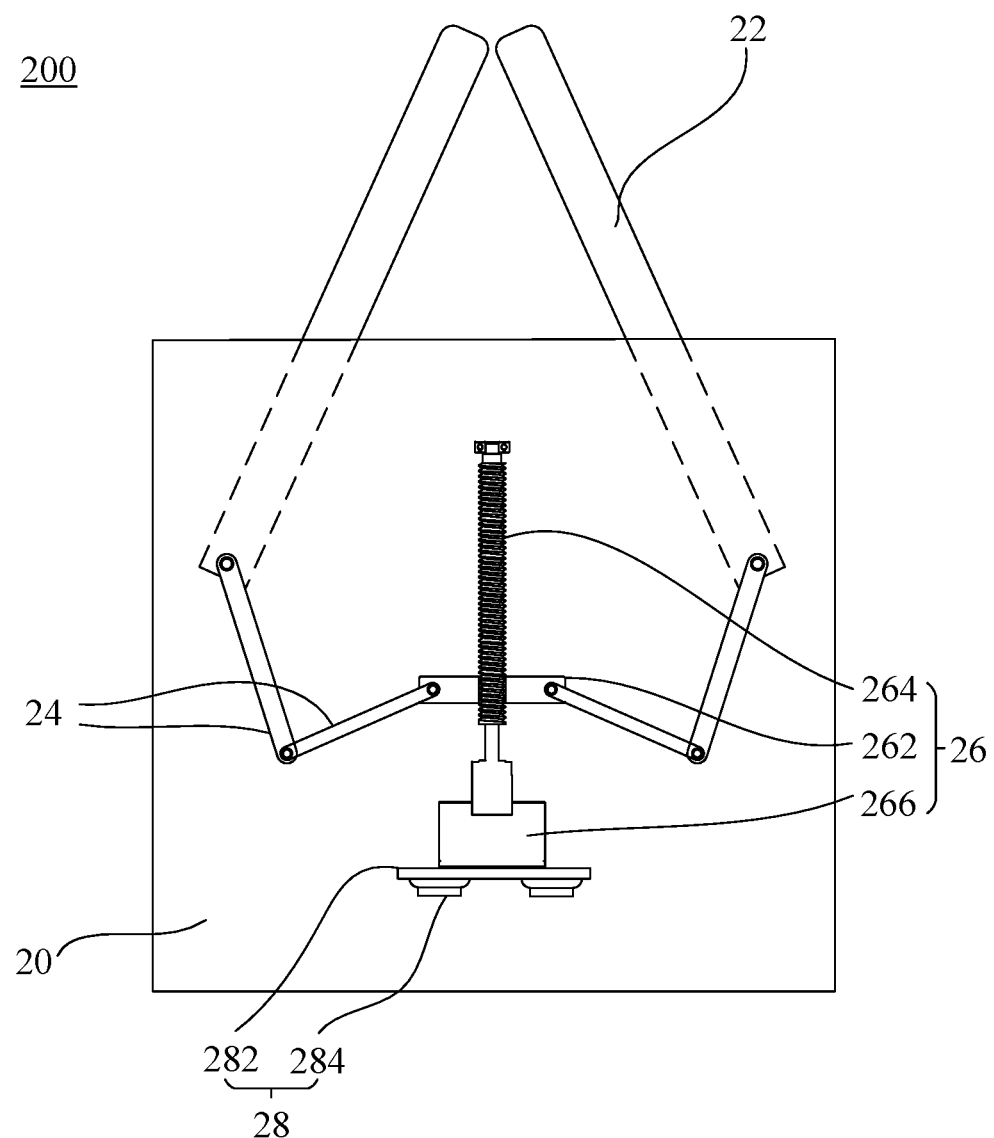
FIG. 3 is a structural diagram of a gripper of a robot according to an exemplary embodiment of the present disclosure.

FIG. 3 is a structural diagram of a gripper 200 of a robot according to another embodiment of the present disclosure. The gripper 200 may include a case 20, multiple fingers 22, multiple connecting rods 24, a driving assembly 26, and a force detecting assembly 28. The driving assembly 26 may include a nut 262, a lead screw 264, and a driving component 266. The force detecting assembly 28 includes a connecting plate 282 and a force sensor 284. The structure of the gripper 200 is similar to the gripper 100 described above. However, for the gripper 200, the driving component 266 may be installed on the connecting plate 282, and configured to detect an axial force applied by the driving component 266 onto the connecting plate 282. The lead screw 264 may be connected to the driven end of the driving component 266 by a mechanism capable of transmitting axial force, e.g., a thrust bearing. Thus, the force applied by the nut 262 on the lead screw 264 may be transmitted to the connecting plate 282 and the force sensor 284. Therefore, the force sensor 284 of the force detecting assembly 28 may measure the force so as to calculate the force applied on an external object.

FIG. 4 is a structural diagram of a gripper 300 of robot according to another embodiment of the present disclosure. The gripper 300 of this embodiment may include a case 30, multiple fingers 32, multiple connecting rods 34 similar to the gripper 100 or the gripper 200 described above. However, the gripper 300 may further include a driving assembly 36 and a force detecting assembly 38. The driving assembly 36 may include a support 362, a motor 364 and a gear rack 366. The support 362 may be fixedly connected to the second end of each of the connecting rods 34. The motor 364 may be installed on the support 362, and a pinion 3642 may be set on the driven end of the motor 364. The gear rack 366 may include a housing 3662 and a gear rack 3664 arranged on the housing 3662. The housing 3662 may be slidably connected to the case 30 along the moving direction of the second end of the connecting rods 34. The gear rack 3664 may also extend along said moving direction and may be engaged with the pinion 3642. Moreover, the force detecting assembly 38 may abut against the housing 3662 so as to limit a position of the housing 3662 along the moving direction. In this embodiment, the motor 364 may drive the pinion 3642 to rotate. As the pinion 3642 is engaged with the gear rack 3664 arranged on the housing 3662 which is supported by the force detecting assembly 38 along the moving direction, the pinion 3642 may drive the motor 364 together with the support 362 in return to move along said moving direction of the second end of the connecting rods 34. Thus, the fingers 32 of the gripper 300 may be clasped to hold an external object, and the force detecting assembly 38 may measure the feedback force from the housing 3662.

The present disclosure also provides a robot adapted to catch an object. The robot may include one or more gripper as described in any one of the above-described embodiments.

According to the present disclosure, as the driving assembly of the gripper may be connected to the second end of each connecting rod while the first end of each connecting rod may be fixedly connected to one finger of the gripper, the rotation of the fingers of the gripper may be driven by the driving assembly. Moreover, since the driving assembly is limited by the force detecting assembly in the moving direction of the second end of each connecting rod, the force detecting assembly may detect the force from the driving assembly. With this force, the grasping force of the gripper may be calculated. Thus, such implementations of the present disclosure may be utilized to determine the force applied on the grasped object, which may improve the control of a robot.

One skilled in the art should understand that at least a subset of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

The foregoing are merely embodiments of the present disclosure, and are not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A gripper of a robot, comprising:
   a case;
   a plurality of fingers rotatably connected to the case;
   a plurality of connecting rods, wherein a first end of each of the connecting rods is connected to a respective one of the plurality of fingers;
   a driving assembly connected to a second end of each of the connecting rods, and configured to drive the second end of each of the connecting rods to move along a moving direction so as to drive the plurality of fingers to rotate; and
   a force detecting assembly connected to the case and the driving assembly, and configured to limit a position of the driving assembly along the moving direction and to detect a force from the driving assembly,
   wherein the driving assembly comprises:
      a nut connected to the second end of each of the connecting rods;
      a lead screw penetrating through the nut and reciprocally coupled with the nut and
      a driving component connected to the lead screw and configured to rotate the lead screw so as to move the nut and the second end of each of the connecting rods along the moving direction, wherein the force detecting assembly is connected to at least one of the lead screw and the driving component, and wherein the force detecting assembly comprises:
- a connecting plate on which the driving component is installed; and
- a force sensor fixedly connected to the case and the connecting plate and configured to detect an axial force applied by the driving component on the connecting plate.

2. The gripper of claim 1, wherein the connecting plate is rotatably connected to the lead screw, wherein the connecting plate is fixed with the lead screw along the moving direction.

3. The gripper of claim 2, wherein:
the connecting plate is connected to the lead screw through a rolling bearing capable of transmitting axial force and radial force.

4. The gripper of claim 1, wherein:
the force sensor includes one or more of a tension sensor, a pressure sensor, and a tension and pressure sensor.

5. The gripper of claim 2, wherein:
a first end of the lead screw is rotatably and slidably connected to the case to constitute a sliding pivot pair; and
a second end of the lead screw is slidably connected to a driven end of the driving component to constitute a sliding pair.

6. The gripper of claim 1 wherein the driving component is a motor.

7. The gripper of claim 1, wherein the driving assembly further comprises:
- a support connected to the second end of each of the connecting rods;
- a motor installed on the support, wherein a pinion is set on a driven end of the motor; and
- a gear rack assembly comprising a housing and a gear rack,
wherein the housing is slidably connected to the case along the moving direction,
wherein the gear rack extends along the moving direction and is engaged with the pinion, and
wherein the force detecting assembly abuts against the housing to limit a position of the housing along the moving direction.

8. A gripper for catching an object, comprising:
a case;
a plurality of fingers rotatably connected to the case, wherein an end of each of the fingers extends outside the case for catching the object;
a plurality of connecting rods, wherein a first end of each of the connecting rods is fixedly connected to a respective one of the plurality of fingers;
a driving assembly connected to a second end of each of the connecting rods, and configured to drive the second end of each of the connecting rods to move in a first direction to clasp the fingers or in a second direction to unclasp the fingers; and
a force detecting assembly connected to the case and the driving assembly, wherein the force detecting assembly is configured to limit a position of the driving assembly in the first direction or in the second direction, and to detect a feedback force from the driving assembly when the fingers are clasped and catch the object,
wherein the driving assembly comprises:
- a nut connected to the second end of each of the connecting rods;
- a lead screw penetrating through the nut and reciprocally coupled with the nut and
- a motor connected to the lead screw and configured to rotate the lead screw so as to move the nut and the second end of each of the connecting rods in the first direction or in the second direction, and wherein the force detecting assembly comprises:
- a connecting plate connected to the lead screw through a first ball bearing capable of transmitting axial and radial force; and
- a force sensor connected to the case and the connecting plate, and configured to detect the feedback force applied on the connecting plate by the lead screw.

9. The gripper of claim 8, wherein:
a first end of the lead screw is connected to the case through a second ball bearing, wherein the second ball bearing provides radial support only; and
a second end of the lead screw is slidably connected to a driven end of the motor to constitute a sliding pair.

10. The gripper of claim 8, wherein:
a first end of the lead screw is connected to the connecting plate through the first ball bearing; and
a second end of the lead screw is slidably connected to a driven end of the motor to constitute a sliding pair.

11. A robot adapted to catch an object, comprising:
a case;
a plurality of fingers rotatably connected to the case;
a plurality of connecting rods, wherein a first end of each of the connecting rods is fixedly connected to a respective one of the plurality of fingers;
a driving assembly connected to a second end of each of the connecting rods, and configured to drive the second end of each of the connecting rods to move along a moving direction so as to drive the plurality of fingers to rotate; and
a force detecting assembly connected to the case and the driving assembly, and configured to limit a position of the driving assembly along the moving direction and to detect a force from the driving assembly,
wherein the driving assembly comprises:
- a nut connected to the second end of each of the connecting rods;
- a lead screw penetrating through the nut and reciprocally coupled with the nut and
- a driving component connected to the lead screw and configured to rotate the lead screw so as to move the nut and the second end of each of the connecting rods along the moving direction,
wherein the force detecting assembly is connected to one selected from the group of the lead screw and the driving component, and wherein the force detecting assembly comprises:
- a connecting plate rotatably connected to the lead screw, wherein the connecting plate is fixed with the lead screw along the moving direction; and
- a force sensor connected to the case and the connecting plate, and configured to detect an axial force applied to the connecting plate by the lead screw.

12. The robot of claim 11, wherein:
the connecting plate is connected to the lead screw through a rolling bearing capable of transmitting axial force and radial force.

13. The robot of claim 12, wherein:
a first end of the lead screw is rotatably and slidably connected to the case to constitute a sliding pivot pair; and a second end of the lead screw is slidably connected to a driven end of the driving component to constitute a sliding pair.

14. The robot of claim 13, wherein:

the force sensor includes one or more of a tension sensor, a pressure sensor, and a tension and pressure sensor; and the driving component is a motor.

* * * * *